(12) United States Patent
Lo et al.

(10) Patent No.: US 7,382,605 B2
(45) Date of Patent: Jun. 3, 2008

(54) ELECTRONIC DEVICE WITH SUCKER-FIXED KEYBOARD

(75) Inventors: Chien-Sheng Lo, Taipei (TW); Hung-Chung Ku, Taipei (TW); Chih-Kai Hu, Taipei (TW); Pin-An Hsieh, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/308,882

(22) Filed: May 22, 2006

(65) Prior Publication Data

US 2006/0291150 A1    Dec. 28, 2006

(30) Foreign Application Priority Data

Jun. 28, 2005   (TW)   ............... 94121561 A (51) Int. Cl.
*H05K 7/00* (2006.01)

(52) U.S. Cl. ........................ 361/680; 400/691

(58) Field of Classification Search ................ 361/680; 400/691
See application file for complete search history.

(56) References Cited

U.S. PATENT DOCUMENTS 6,688,790 B2 * 2/2004 Ito .................. 400/490
6,705,782 B2 * 3/2004 Cheng ................. 400/472
6,812,420 B2 * 11/2004 Kako et al. ............. 200/344
2004/0085716 A1 * 5/2004 Uke ................... 361/680

FOREIGN PATENT DOCUMENTS

| CN | 2517026 | Y |   | 10/2002 |
|----|---------|---|---|---------|
| CN | 2541898 | Y |   | 3/2003  |
| CN | 1595542 | A |   | 3/2005  |
| CN | 1595576 | A |   | 3/2005  |
| JP | 2001250831 | A | * | 9/2001 |
| KR | 2005057736 | A | * | 6/2005 |

* cited by examiner

*Primary Examiner*—Jayprakash N Gandhi
*Assistant Examiner*—Ingrid Wright
(74) *Attorney, Agent, or Firm*—Jianq Chyun IP Office (57) ABSTRACT

An electronic device having a keyboard fixed through a set of suckers and most suitably applied to the host body of an electronic product is provided. The electronic device includes a casing, a keyboard module and at least a sucker. The keyboard module has at least a key and the sucker is used for attaching the keyboard module to the casing. Furthermore, the sucker includes a first coupling part and a second coupling part. The first coupling part is used for sucking up the keyboard module and the second coupling part is used for fixing the sucker to the casing so that the electronic device and the host body can be assembled together smoothly.

5 Claims, 7 Drawing Sheets

ELECTRONIC DEVICE WITH SUCKER-FIXED KEYBOARD

CROSS-REFERENCE TO RELATED APPLICATION

This application claims the priority benefit of Taiwan application serial no. 94121561, filed on Jun. 28, 2005. All disclosure of the Taiwan application is incorporated herein by reference.

BACKGROUND OF THE INVENTION

1. Field of the Invention

The present invention relates to an electronic device. More particularly, the present invention relates to an electronic device having a keyboard module.

2. Description of the Related Art

In this information era, people's reliance on electronic products is increasing every day. Our demands for high performance and portable electronic devices have produced many types of indispensable gadgets. In fact, notebook personal computers, cellular phones and personal digital assistant (PDA) have become indispensable tools in our everyday life.

Figure 1:
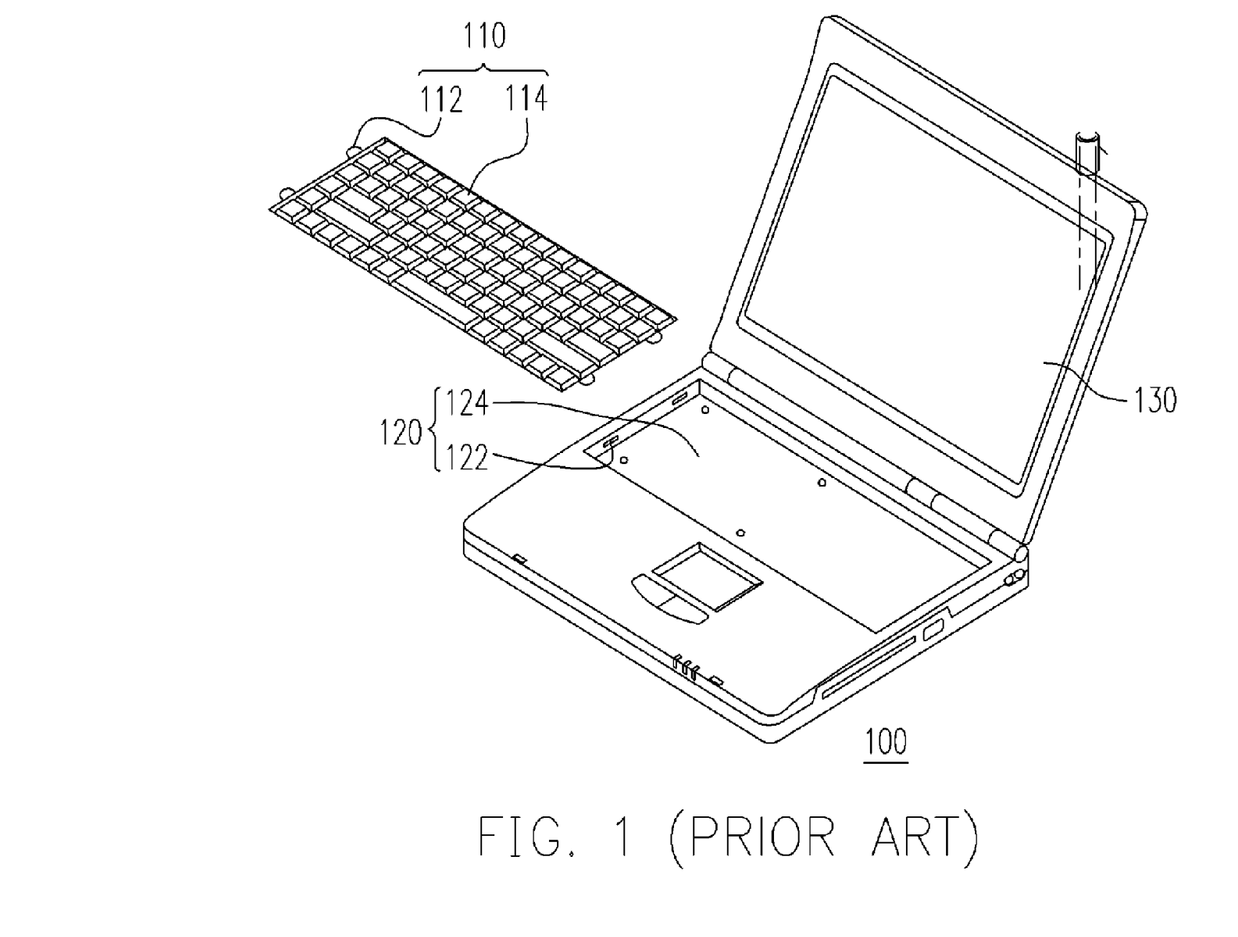
FIG. 1 is a diagram providing a view of a partially dissembled conventional electronic product.

All the aforementioned electronic products have at least a man-machine interface for inputting user instructions so that the system inside the electronic product can respond by executing such instructions. At present, the most commonly used man-machine interface is a keyboard module. FIG. 1 is a diagram providing a view of a partially disassembled conventional electronic product. Using a notebook computer 100 shown in FIG. 1 as an example, the notebook computer 100 has a keyboard module 110, a host body 120 and a screen 130. The keyboard module 110 has a plurality of first latching elements 112 and a plurality of keys 114. Furthermore, the first latching elements 112 are disposed on the respective sides of the keyboard module 110. In addition, the host body 120 has a plurality of second latching elements 122 that corresponds to the first latching elements 112 and a receptacle 124 for accommodating the keyboard module 110. The second latching elements 122 are latching grooves disposed on the respective sidewalls of the receptacle 124, for example.

Accordingly, the keyboard module 110 is enclosed inside the receptacle 124 and fixed to the host body 120 by latching the plurality of first latching elements 112 to the corresponding second latching elements 122 on the respective sidewalls of the receptacle 124.

However, to accommodate and fix the keyboard module inside the receptacle, the first latching elements must latch onto the second latching elements disposed on the respective sides of the receptacle so that the keyboard module and the receptacle are tightly joined together. The aforementioned assembling process often lead to the bulging of the keyboard module above the receptacle. Ultimately, overall quality of the notebook computer is affected. In particular, when there is any dimensional mismatch between the electronic device and the receptacle or any dimensional mismatch between the first latching elements and the second latching elements, the smoothness of the keyboard module mounted inside the receptacle will be directly affected. When a user presses down on the key on the keyboard module, the floating sensation may result.

SUMMARY OF THE INVENTION

Accordingly, at least one objective of the present invention is to provide an electronic device with sucker-fixed keyboard such that the electronic device can flush into an electronic product such as a notebook computer when the electronic device and the electronic product are assembled together. As a result, the feeling one has of the electronic device floating on the electronic product is prevented.

To achieve these and other advantages and in accordance with the purpose of the invention, as embodied and broadly described herein, the invention provides an electronic device. The electronic device comprises a casing, a keyboard module and at least a sucker. The keyboard module has at least a key and the sucker is used for sucking the keyboard module onto the casing.

According to one embodiment of the present invention, the keyboard module further includes a bottom plate having a plastic film attached thereon and the sucker sucks onto a first surface of the plastic film, for example.

According to one embodiment of the present invention, the sucker further includes a first coupling part and a second coupling part, for example. The first coupling part is used for sucking the keyboard module and the second coupling part is used for fixing the sucker to the casing. In addition, the first coupling part is a first hollow body and the second coupling part is a first adhesive layer, for example. The second coupling part glues the sucker to the casing.

According to one embodiment of the present invention, the sucker comprises a first coupling part and a second coupling part, for example. The first coupling part is used for sucking the keyboard module and the second coupling part is used for fixing the sucker to the casing. In addition, the first coupling part is a first hollow body and the second coupling part is a second hollow body. The casing includes a first accommodating part and the second coupling part sucks the sucker to the first accommodating part, for example.

According to one embodiment of the present invention, the sucker includes a first coupling part and a second coupling part, for example. The first coupling part is used for sucking the keyboard module and the second coupling part is used for fixing the sucker to the casing. In addition, the first coupling part is a first hollow body and the second coupling part is a first latching part, for example. The casing includes a second latching part such that the first latching part latches into the second latching part. The first latching part is a latching hook and the second latching part is a through hole, for example. The first latching part is suitable for latching into the second latching part.

Accordingly, in the electronic device of the present invention, the keyboard module is attached to the casing through at least a sucker so that the goal of fixing the keyboard module to the casing is achieved. Compared with the conventional technique, the electronic device in the present invention has a better planarity and smoothness after the assembly. Thus, the floating sensation when a key on the keyboard module is depressed is effectively eliminated.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5b is a magnified view of the R region in FIG. 5a.

FIG. 6b is a magnified view of the R region in FIG. 6a.

FIG. 7b is a magnified view of the R region in FIG. 7a.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
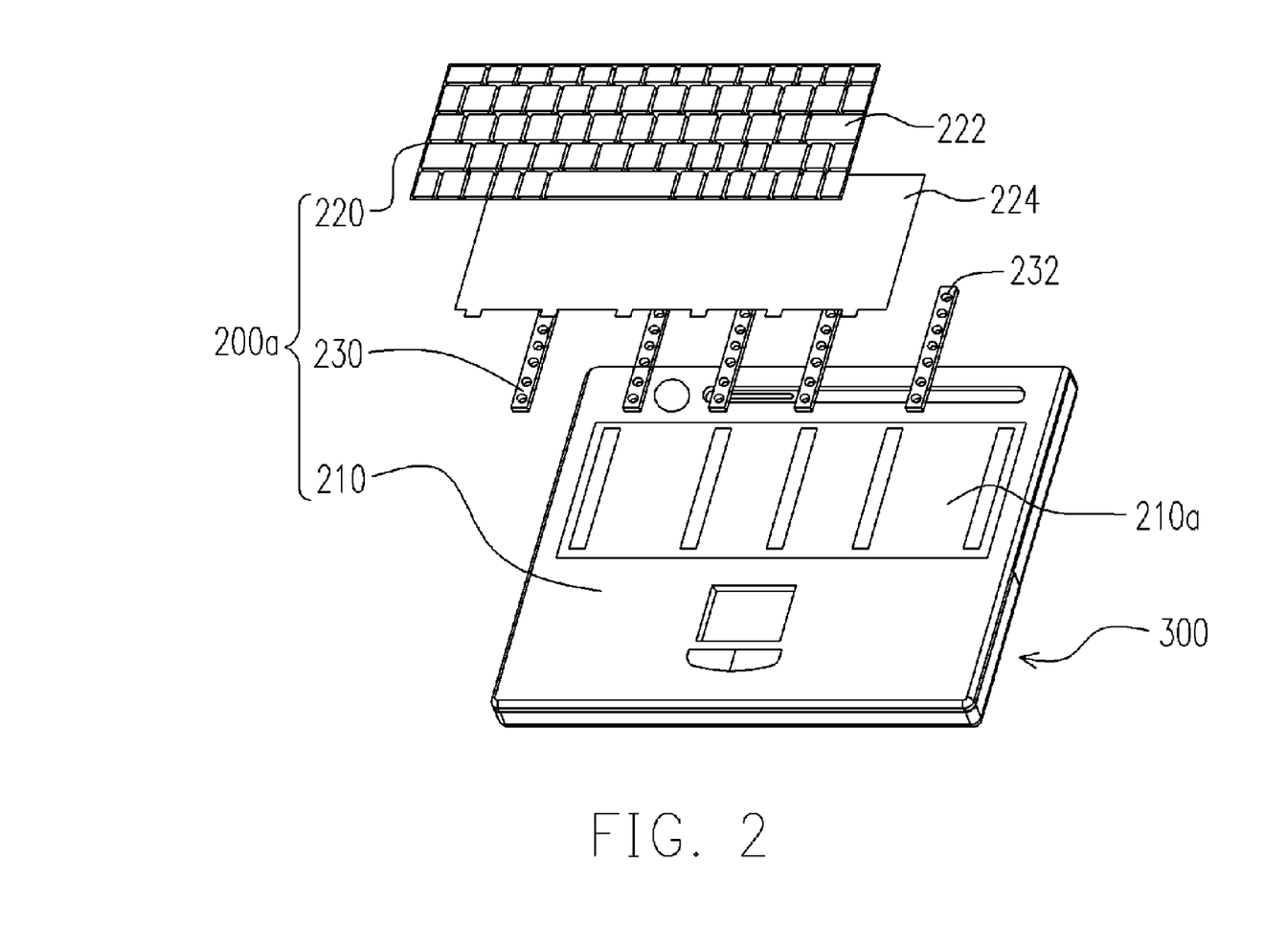
FIG. 2 is an explosion diagram showing the main components of an electronic device assembled to a host body according to a first embodiment of the present invention.

The electronic device of the present invention can be applied to products including notebook computers, mobile phones and personal digital assistants, for example. FIG. 2 is an explosion diagram showing the main components of an electronic device assembled to a host body according to a first embodiment of the present invention. As shown in FIG. 2, the electronic device 200a of the present embodiment includes a casing 210, a keyboard module 220 and at least a sucker 230. The casing has a receptacle 210a for accommodating the keyboard module 220. The keyboard module has one or more keys 222 thereon. Furthermore, the sucker 230 is used for sucking the keyboard module 220 to the casing 210. The sucker 230 has one or more sucker units 232, for example.

Figure 3:
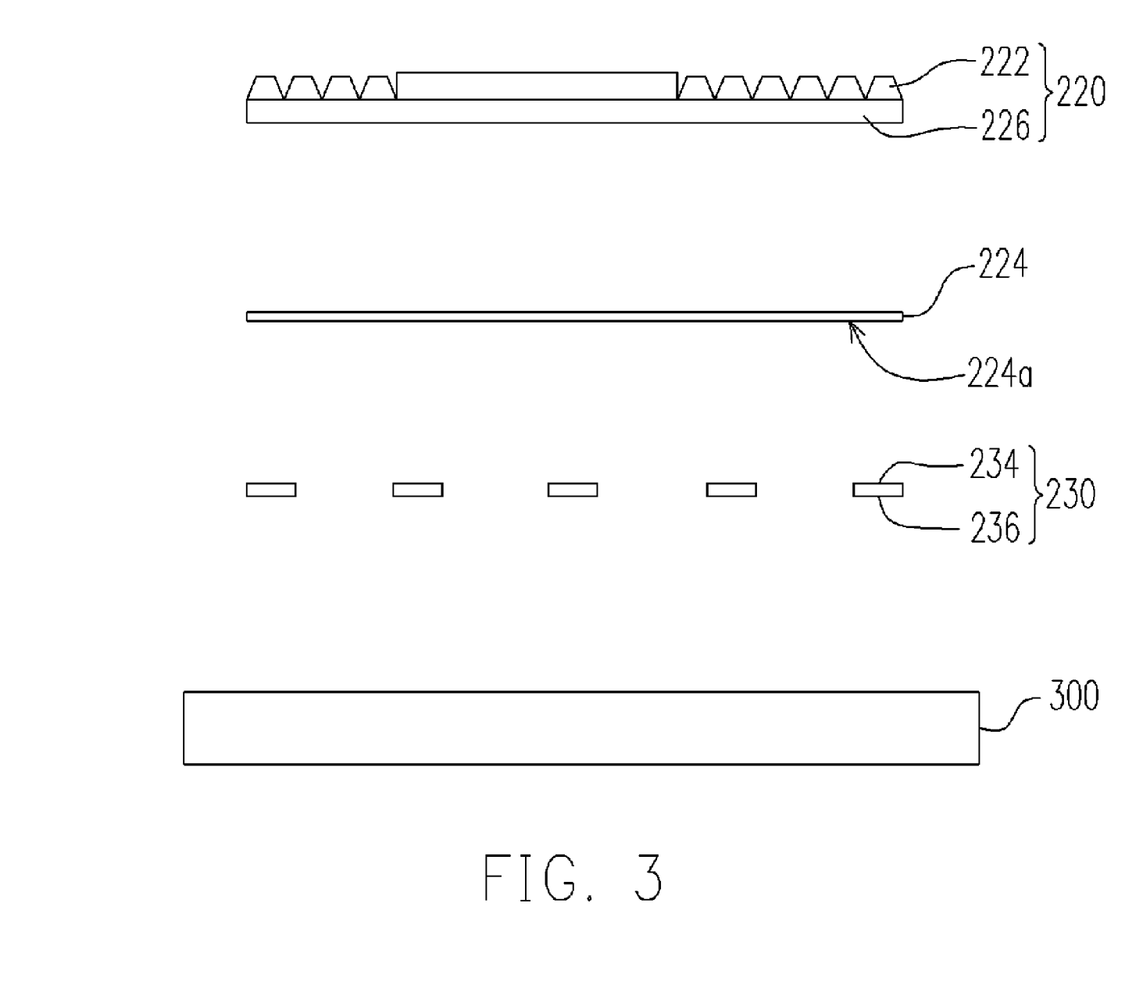
FIG. 3 is a front view of the electronic device in FIG. 2 assembled to a host body.

FIG. 3 is a front view of the electronic device in FIG. 2 assembled to a host body. As shown in FIGS. 2 and 3, the sucker 230 includes a first coupling part 234 and a second coupling part 236, for example. The first coupling part 234 is sued for sucking the keyboard module 220. The second coupling part 236 is used for contacting the casing 210 and fixing the sucker 230 to the casing 210. Furthermore, a plastic film 224 may also be attached to a bottom plate 226 of the keyboard module 220. The plastic film 224 has a first surface 224a with a smooth surface, for example. Therefore, the sucker 230 can also fasten the keyboard module 220 to the casing 210 by sucking to the first surface 224a.

The sucker 230 is disposed on the casing 210 and the plastic film 224 is attached to the bottom plate 226 of the keyboard module 220. The keyboard module 220 is positioned above the sucker 230 and then a pressure is applied to the keyboard module 220 so that the keyboard module 220 can flush into the casing 210 to form a smooth assembly through the suction between the plastic film 224 and the sucker 230. In the following, the suction between the keyboard module 220 and the sucker 230 is described in more detail.

Figure 4:
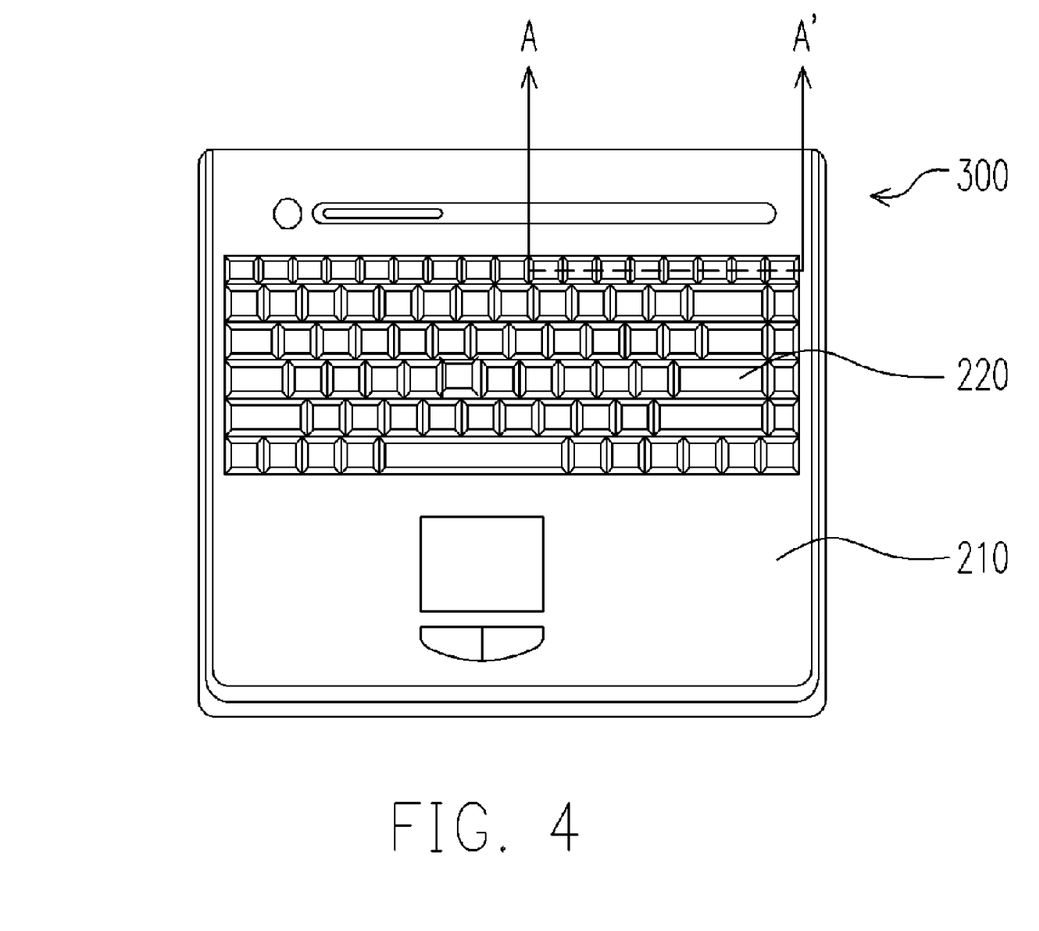
FIG. 4 is a top view of the electronic device in the first embodiment of the present invention assembled to a host body.
Figure 5A:
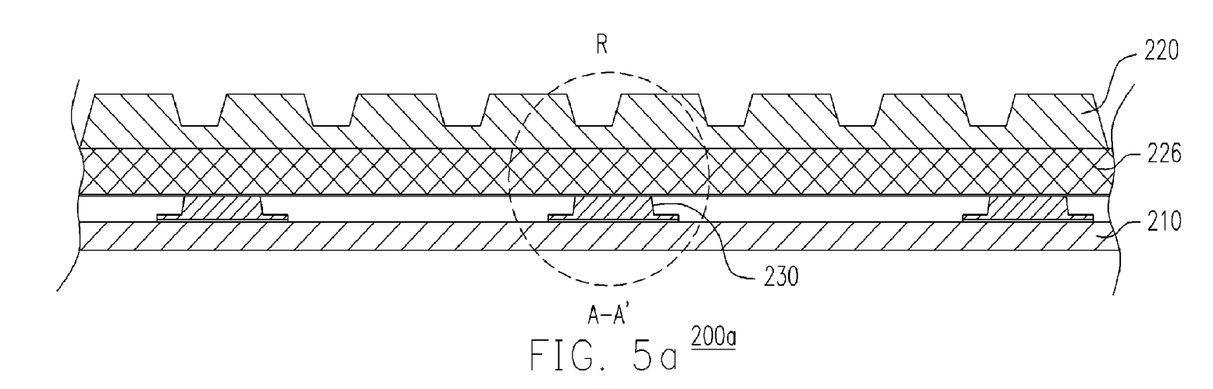
FIG. 5a is a magnified view of the cross-section along line A-A' of the electronic device in FIG. 4.
Figure 5B:
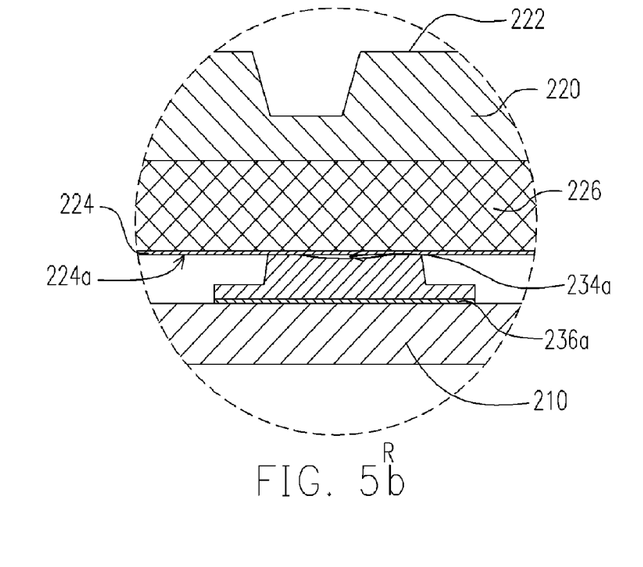

FIG. 4 is a top view of the electronic device in the first embodiment of the present invention assembled to a host body. FIG. 5a is a magnified view of the cross-section along line A-A' of the electronic device in FIG. 4. FIG. 5b is a magnified view of the R region in FIG. 5a. As shown in FIGS. 4, 5a and 5b, the first coupling part 234 of the sucker 230 is a first hollow body 234a and the second coupling part 236 is a first adhesive layer 236a, for example. Through the first adhesive layer 236a, the sucker 230 is firmly attached to the casing 210. When a pressure is applied to the keyboard module 220 disposed above the sucker 230, the air within the first hollow body 234a is squeezed out so that a suction on the plastic film 224 attached to the bottom plate 226 of the keyboard module 220 is developed. Thus, the keyboard module 220 is smoothly and firmly attached to the sucker 230. The plastic film 224 and the sucker 230 are fabricated, for example, using a plastic material so that they can form a tight contact with each other. In other words, the sucker 230 can smoothly suck up the plastic film 224 and fasten the keyboard module 220.

Accordingly, the keyboard module 220 is smoothly fastened to the first coupling part 234 of the sucker 230 while the second coupling part 236 of the sucker 230 is effectively adhered to the casing 210. Consequently, the electronic device 200a in the present invention can smoothly integrate with the casing 210. When the keyboard module 220 on the electronic device 200a is pressed, the strange floating sensation that often occurs in a conventional keyboard module no longer appears.

Figure 6A:
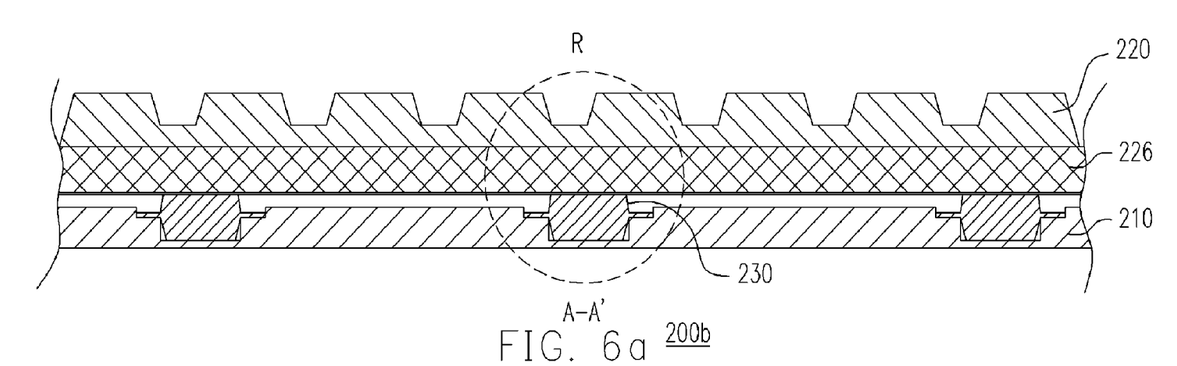
FIG. 6a is a magnified view of the cross-section along line A-A' of FIG. 4 when an electronic device according to a second embodiment of the present invention is assembled to the host body.
Figure 6B:
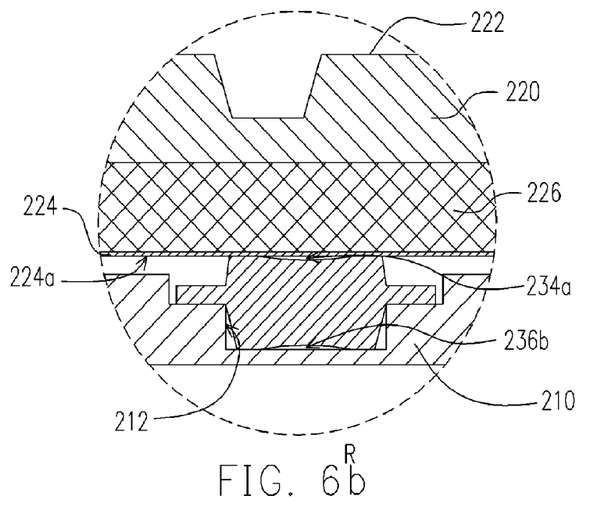

FIG. 6a is a magnified view of the cross-section along line A-A' of FIG. 4 when an electronic device according to a second embodiment of the present invention is assembled to the host body. FIG. 6b is a magnified view of the R region in FIG. 6a. As shown in FIGS. 4, 6a and 6b, the electronic device 200b in the present embodiment and the electronic device 200a in the first embodiment are similar. The only difference is that the second coupling part 236 in the present embodiment has a second hollow body 236b and the casing 210 has a first accommodating receptacle 212. In other words, the suction between the sucker 230 and the plastic film 224 in the present embodiment is identical to the first embodiment and hence will not be repeatedly described here. The fastening between the sucker 230 and the casing 210 is achieved by pressing the second hollow body 236b of the sucker 230 so that the second hollow body 236b and the first accommodating receptacle 212 form a suction to grip the sucker 230 to the casing 210. Hence, the electronic device 200b in the present embodiment can smoothly integrate with the host body 300.

Figure 7A:
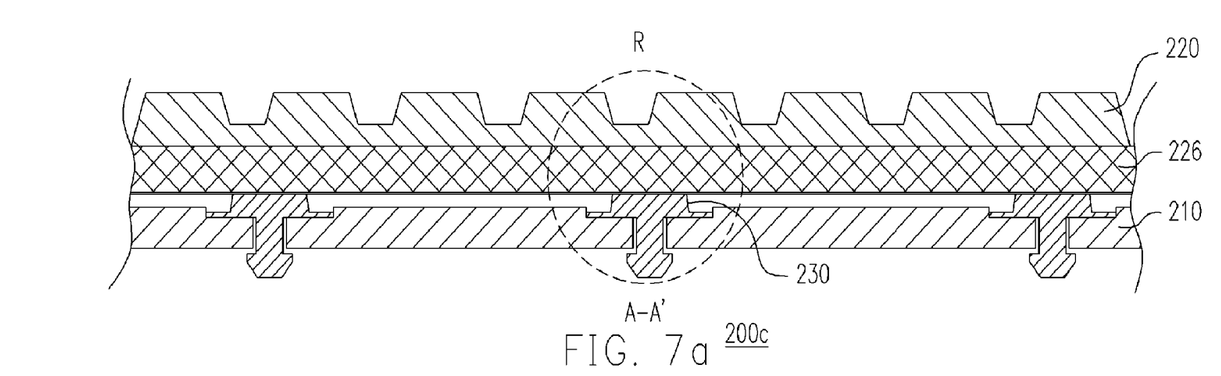
FIG. 7a is a magnified view of the cross-section along line A-A' of FIG. 4 when an electronic device according to a third embodiment of the present invention is assembled to the host body.
Figure 7B:
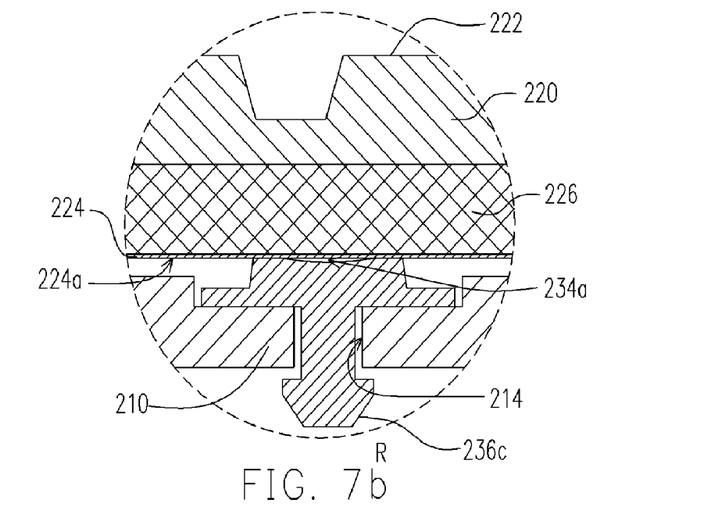

FIG. 7a is a magnified view of the cross-section along line A-A' of FIG. 4 when an electronic device according to a third embodiment of the present invention is assembled to the host body. FIG. 7b is a magnified view of the R region in FIG. 7a. As shown in FIGS. 4, 7a and 7b, the electronic device 200c in the present embodiment and the electronic device 200a in the first embodiment are also similar. The only difference is that the second coupling part 236 in the present embodiment is a first latching part 236c and the casing 210 has a second latching part 214, for example. In other words, the suction between the sucker 230 and the plastic film 224 in the present embodiment is identical to the first embodiment and hence will not be repeatedly described here. The fastening relationship between the first latching part 236*c* of the sucker 230 and the second latching part 214 of the casing 210 is as follows.

In the present embodiment, the sucker 230 is fastened to the casing 210 by latching the first latching part 236*c* of the sucker 230 into the second latching part 214 of the casing 210. The first latching part 236*c* can be a hook and the second latching part 214 can be a through hole, for example. As a result, the electronic device 200*c* in the present embodiment can integrate smoothly with the host body 300.

In summary, the present invention provides an electronic device that can integrate smoothly with an electronic product such as a notebook computer. In the electronic device of the present invention, the keyboard module is attached to the casing through at least a sucker so that the keyboard module is smoothly fixed to the casing. The sucker can be fixed to the casing through one of the methods described in the aforementioned embodiments. The casing is part of the host body of the electronic product. Thus, the electronic device in the present invention can be smoothly assembled into the electronic product of the host body.

In the conventional technique, a keyboard module needs a set of latching elements to fasten to the host body of the electronic product. Therefore, it is difficult to assemble the keyboard module smoothly to the host body of the electronic product especially when there is dimensional mismatch between the keyboard module and the latching elements. In the present invention, however, the keyboard module is fastened to the casing through a sucker so that a higher degree of planarity and smoothness can be obtained. This provides an effective means of eliminating the user from having the feeling of touching something floating when the keys on the keyboard module are pressed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a casing:
   a keyboard module having at least a key; and
   at least a sucker sucking the keyboard module to the casing, wherein the sucker comprises a first coupling part and a second coupling part such that the first coupling part sucks to the keyboard module and the second coupling part fastens to the casing, and the first coupling part is a first hollow body, the second coupling part is a first latching part and the casing includes a second latching part such that the first latching part can latch onto the second latching part.

2. The electronic device of claim 1, wherein the first latching part is a latching hook and the second latching part is a through hole such that the first latching part can latch onto the second latching part.

3. The electronic device of claim 1, wherein the keyboard module further comprises a bottom plate having a plastic film attached thereon with the sucker sucked onto a first surface of the plastic film.

4. The electronic device of claim 1, wherein the first coupling part is a first hollow body and the second coupling part is an adhesive layer such that the second coupling part attaches the sucker to the casing.

5. The electronic device of claim 1, wherein the first coupling part is a first hollow body and the second coupling part is a second hollow body and the casing includes a first accommodating receptacle such that the second coupling part attaches the sucker to the first accommodating receptacle.

* * * * *